F. L. STUART.
CONVEYING AND LOADING APPARATUS.
APPLICATION FILED MAY 12, 1916.
1,204,203.
Patented Nov. 7, 1916.
4 SHEETS—SHEET 2.
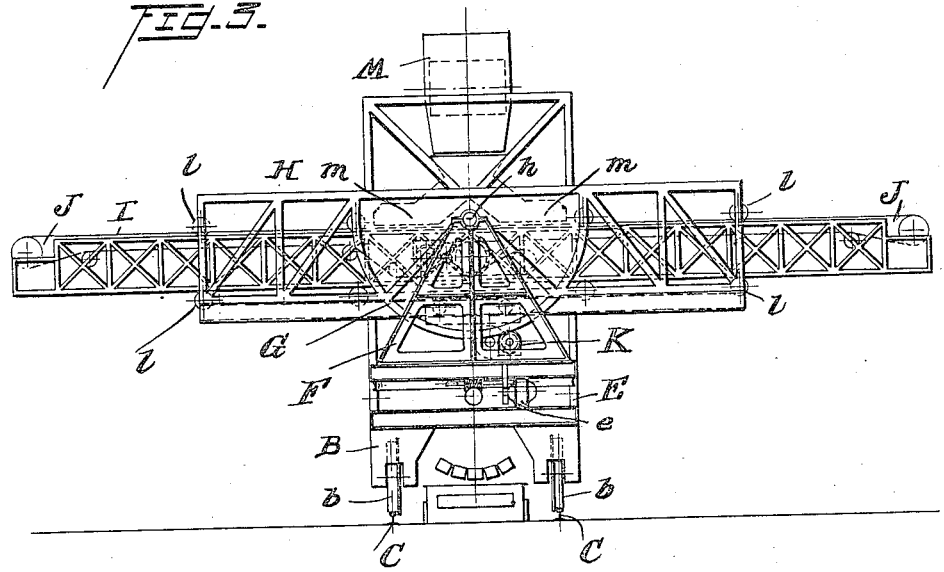
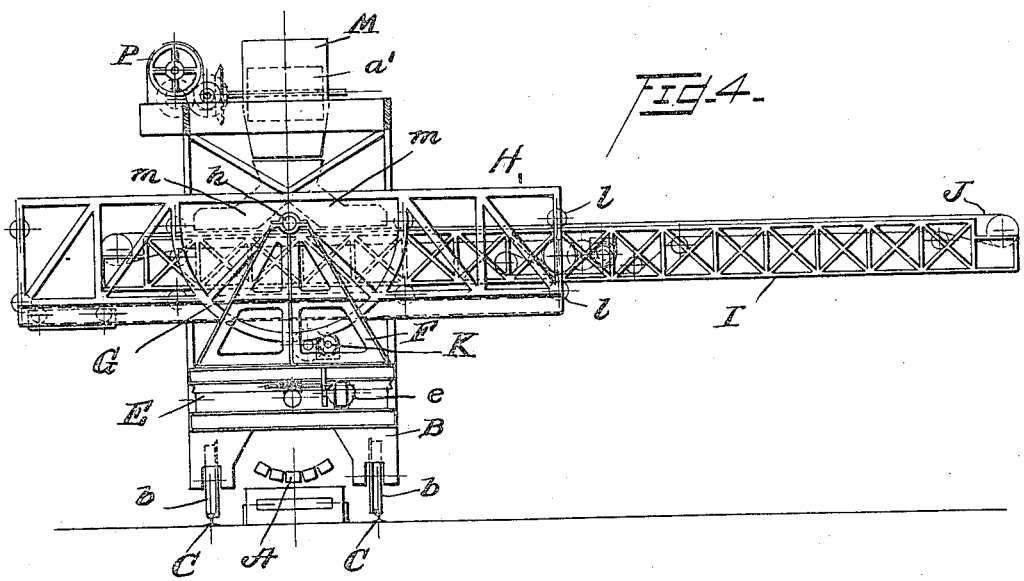
Inventor
Francis Lee Stuart
Witnesses
By Baldwin Wight
his Attorneys

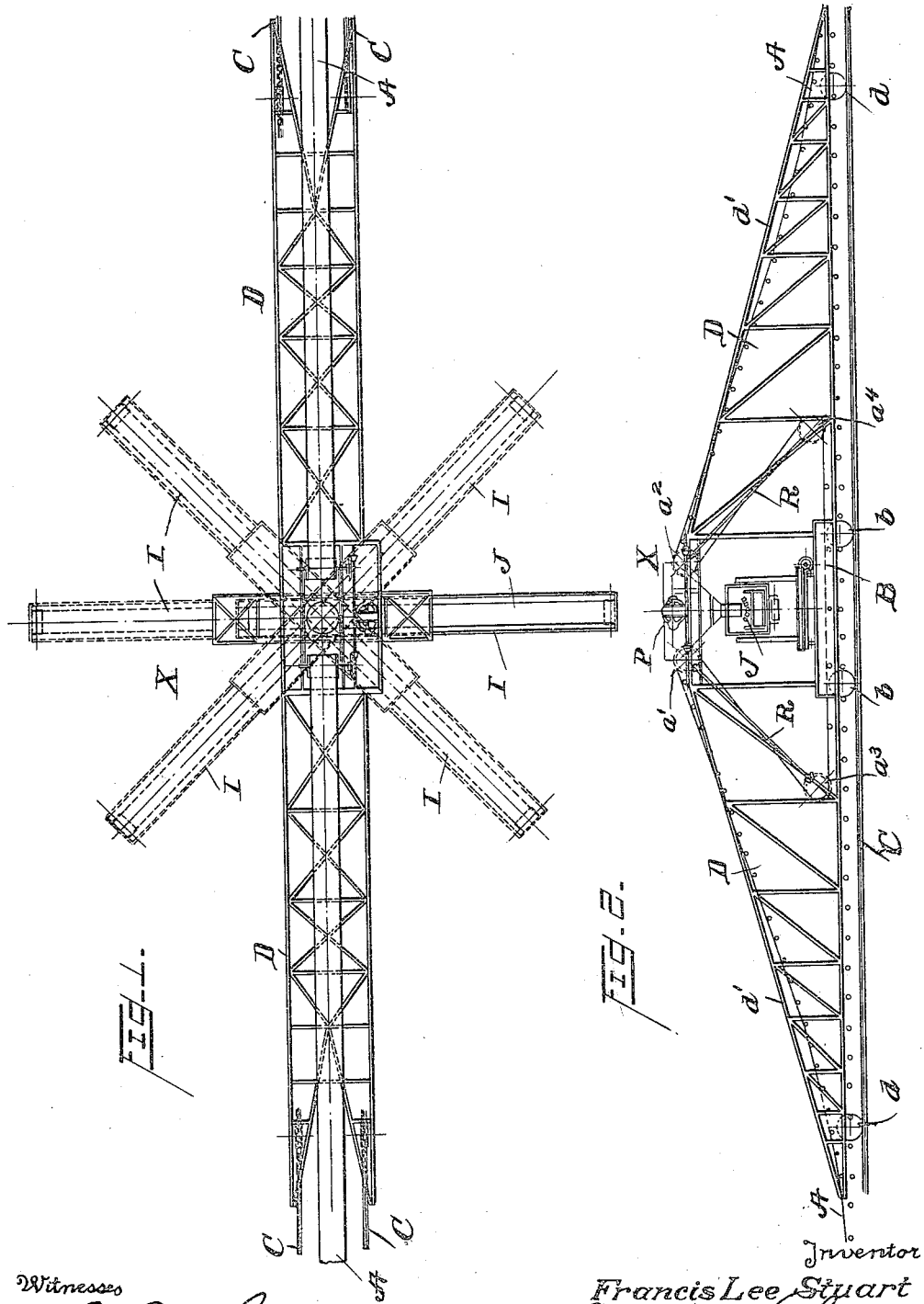

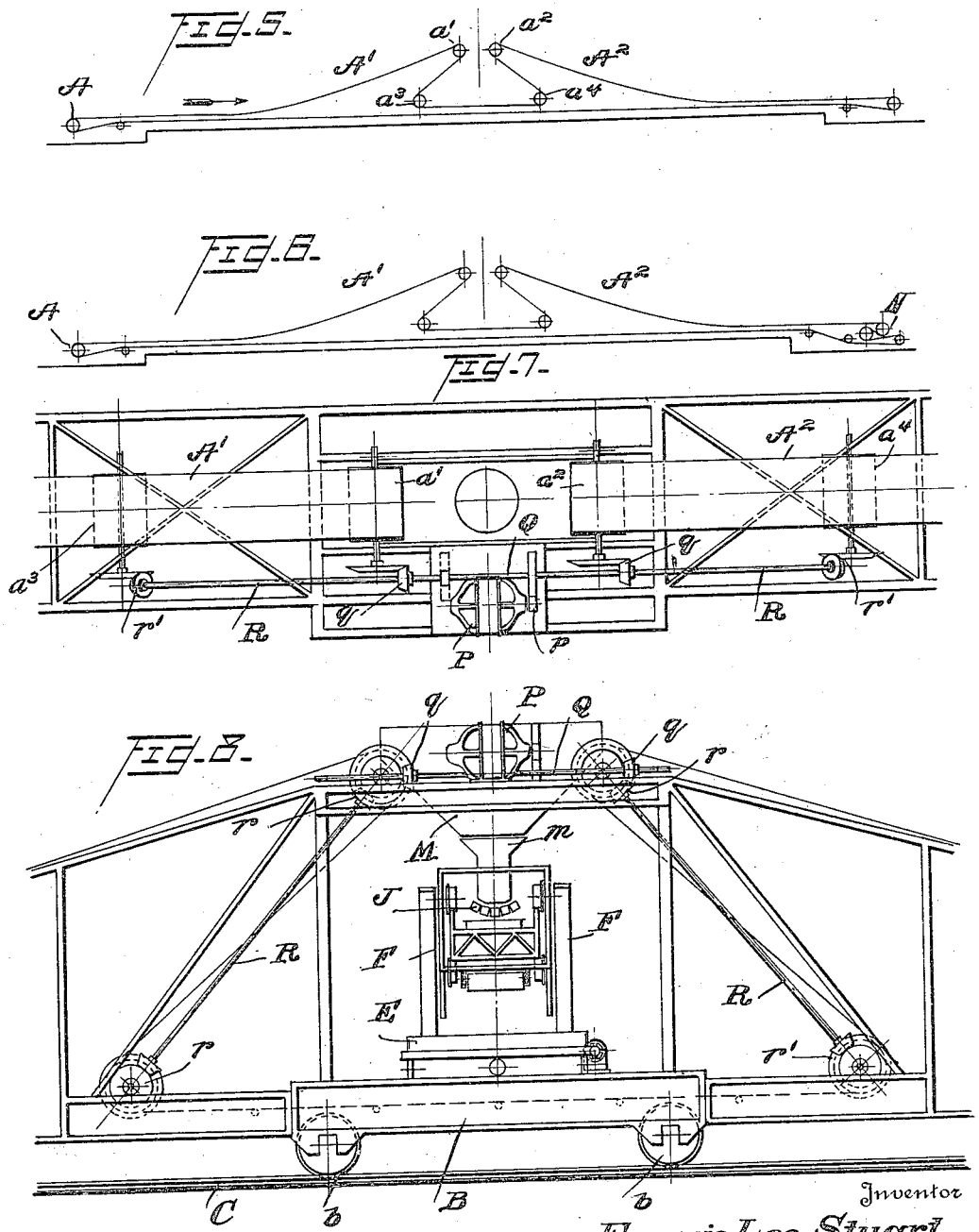

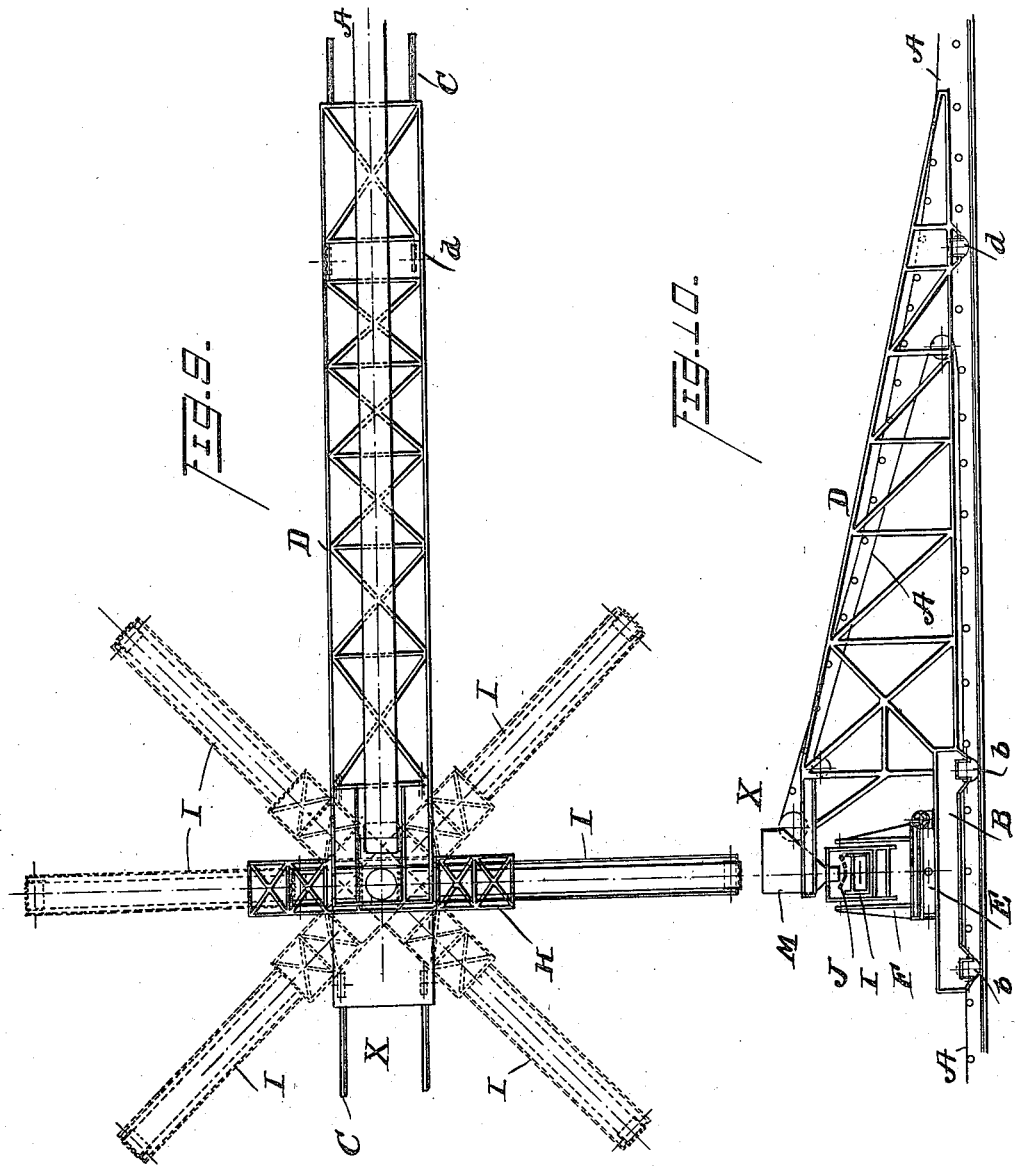

UNITED STATES PATENT OFFICE.

FRANCIS LEE STUART, OF BALTIMORE, MARYLAND.

CONVEYING AND LOADING APPARATUS.

1,204,203. Specification of Letters Patent. Patented Nov. 7, 1916.

Application filed May 12, 1916. Serial No. 96,988.

*To all whom it may concern:*

Be it known that I, FRANCIS LEE STUART, a citizen of the United States, residing in Baltimore, Maryland, have invented certain new and useful Improvements in Conveying and Loading Apparatus, of which the following is a specification.

This invention relates to apparatus for conveying coal, ore and other such material by means of conveyer belts to apparatus which receives the material so conveyed and delivers it to storage piles, bins, cars, ships or other receivers and the object of the invention is to provide an apparatus which may be used in connection with an ordinary conveyer belt and which is so constructed that it may receive material from such conveyer, whether said conveyer be moved in one direction or the other, and will carry and deliver the material at any desired elevation or in any desired vertical plane and which is movable to any desired place while still in operative relation with the main conveyer.

In carrying out my invention I employ a main conveyer-belt which may be supported and operated in any usual way, and I connect with this belt an apparatus which is movable on a track to deliver the material at any required place along the track. The belt is formed with a looped portion which is supported on an inclined frame or truss mounted on a truck traversing the track, the belts being reeved in the inclined frame in such manner that the upper end of the looped portion thereof will always deliver at the same elevation whatever be the position of the truck on the track. The truck supports a turntable on which is erected a frame supporting an oscillating frame to which is secured a cage having guides in which travels a delivery conveyer frame which is movable endwise in the cage so as to project from either end thereof and which supports an endless conveyer-belt that receives material from a hopper into which the main conveyer-belt discharges. The arrangement is such that material may be delivered continuously from the main conveyer-belt to the delivery conveyer and the latter may be moved in either direction, have its outer end raised and lowered to any desired extent projected as required endwise from the truck in either direction or turned so as to deliver in any desired vertical plane without interfering with the delivery of the material from the hopper.

In the preferred form of the invention the truck is connected with an inclined frame at both front and rear and the conveyer-belt is formed with two loops reeved and guided in the manner before described so that material may be carried to the loading apparatus by the same conveyer-belt whether moved in one direction or the other, and the truck is also preferably provided with motor mechanism for driving the main conveyer-belt which motor mechanism may be used separately to drive said belt or it may be used in connection with or supplemental to the usual driving mechanism.

In the accompanying drawings, Figure 1 is a plan view of conveying and loading apparatus embodying my invention. Fig. 2 shows a side elevation thereof. Fig. 3 shows an end view of the loading apparatus with the delivery conveyer centrally arranged. Fig. 4 is a similar view with the delivery conveyer projected from one side of the truck. Fig. 5 is a diagrammatic view illustrating the manner in which the main conveyer-belt is formed with a double loop so that it may deliver to the loading apparatus when moving in either direction. Fig. 6 is a view similar to Fig. 5 and shows driving mechanism of the usual kind for operating the main conveyer-belt. Fig. 7 is a plan view of a portion of the loading apparatus and illustrates particularly the motor mechanism for driving the main conveyer-belt. Fig. 8 shows a side elevation of a portion of the loading apparatus and illustrates more in detail the motor mechanism for driving the main conveyer-belt. Fig. 9 is a plan view of loading apparatus embodying my improvements wherein a single loop is formed in the main conveyer-belt. Fig. 10 shows a side elevation of the same.

The main conveyer is an endless belt A which may be driven in the usual way and it may also be driven in the manner hereinafter described.

The loading apparatus X comprises a truck B, the wheels $b$ of which traverse a track C. In the form of apparatus shown particularly in Figs. 1 and 2 the truck is connected at each end with a trussed frame D, each of which is supported at its outer end by wheels $d$ traversing the track C. The lower portion of each frame is horizontal, but the upper portion of each frame is inclined as indicated at $d'$. On the truck B is mounted a turntable E which may be operated by motor mechanism $e$, and on the turntable is erected a frame F in which is hung a frame G carrying a box-like structure or cage H. The frame G of the cage H is made to oscillate about a horizontal axis $h$ while it turns with the frame F and the turntable about a vertical axis.

Within the cage H is mounted a delivery conveyer comprising a frame I and an endless belt-conveyer J. The frame I is so mounted that it may move endwise in the cage in such manner as to occupy a central position therein as shown in Fig. 3, or to be projected from either end thereof as indicated in Fig. 4 and also in Fig. 1. Inasmuch as the case is pivoted to move about a horizontal axis $h$ and as it turns with the turntable it is clear that the delivery end of the conveyer may be adjusted in any desired way. Any suitable motor mechanism K may be employed for tilting the cage, and the delivery conveyer J may be operated in any suitable way to drive it in either direction.

$l$ indicates rollers for guiding the frame of the delivery conveyer. Any suitable number of rollers may be employed for this purpose.

The main conveyer delivers to a hopper M provided with chutes $m$ which may be controlled by a suitable gate. These chutes are adapted to deliver to the delivery conveyer when moving in opposite directions. As indicated in Fig. 4 the chutes are mounted to turn and to move coincidentally with the delivery conveyer being separated from the hopper M. The hopper M remains stationary while the chutes follow the adjustment of the delivery conveyer. When the main conveyer-belt is moved in one direction only, the loading apparatus is associated therewith in the manner indicated in Figs. 9 and 10, the main conveyer-belt being reeved in the trussed frame D in the manner shown. In this case the belt is driven by power applied in the usual way at any distant point.

When the loading apparatus is constructed to receive material from the conveyer-belt when the latter is moved in opposite directions, the belt is formed with two loops A′, A², as indicated in Figs. 5 and 6, and also in Fig. 2. The belt may be driven in either direction by power applied at N as indicated in Fig. 6. Power may be applied, however, to the main conveyer-belt by motor mechanism carried by the truck B, or this motor mechanism may be used in connection with the power mechanism N. It will be observed by reference to Figs. 5 and 6 that the upper end of each loop passes over a pulley $a'$ or $a^2$ and that the looped portion is also supported and guided by pulleys $a^3$, $a^4$. If the belt be moving in the direction indicated by the arrow in Fig. 5 it will pass over the pulley $a'$ and it is then extended downwardly in a diagonal direction and passes around the pulley $a^3$, it then passes straight across to the pulley $a^4$ and then extends upwardly in a diagonal direction and passes over the pulley $a^2$ and thence outward. If the belt be moved in the opposite direction it will be supported and guided in a similar way. The shafts of the pulleys $a'$, $a^2$, $a^3$, $a^4$ are connected with a motor P carried by the truck. This motor is geared, as indicated at $p$, with a horizontally arranged shaft Q, the opposite ends of which carry pinions $q$ geared to the shafts of the rollers $a'$, $a^2$, and by gearing indicated at $r$ the motor is connected with diagonally arranged shafts R which extend to the shafts of the rollers $a^3$, $a^4$ and are geared therewith, as indicated at $r'$. In this way the main conveyer-belt A may be driven solely by the motor P carried by the loading apparatus, or it may be used in connection with the usual belt-driving mechanism.

I claim as my invention:

1. The combination with a main conveyer-belt, of a delivery apparatus comprising a truck movable to the point of delivery, a turntable thereon, an oscillating frame supported on the turntable, a delivery conveyer carried by the oscillating frame and mounted to be projected or extended therefrom in either direction, and a hopper receiving material from the main conveyer-belt and discharging upon said extensible delivery conveyer.

2. The combination with a main conveyer-belt, of a truck movable to the point of delivery and connected at each end with an inclined frame supporting a loop of the main conveyer-belt, a horizontally arranged delivery conveyer receiving material from either of said loops, and means for adjusting the delivery conveyer about both a horizontal and a vertical axis.

3. The combination with a main conveyer-belt, of a truck movable to the point of delivery and connected at each end with an inclined frame supporting a loop of the main conveyer-belt, a horizontally arranged delivery conveyer receiving material from either of said loops, means for adjusting the delivery conveyer about both a horizontal and a vertical axis, and motor mechanism carried by the truck and operatively connected with the looped portions of the main conveyer-belt for driving it.

4. The combination with a main conveyer-belt, of a delivery apparatus comprising a truck movable to the point of delivery, a turntable thereon, an oscillating frame supported on the turntable, a delivery conveyer carried by the oscillating frame and mounted to be projected or extended therefrom in either direction, means for moving said delivery conveyer in either direction relatively to the feed and a hopper receiving material from the main conveyer-belt and discharging upon said extensible delivery conveyer in whichever direction it is moved.

5. The combination with a main conveyer-belt, of a truck movable to the point of delivery and connected at each end with an inclined frame supporting a loop of the main conveyer-belt, a horizontally arranged delivery conveyer receiving material from either of said loops, means for driving said delivery conveyer in either direction, and means for adjusting the delivery conveyer about a horizontal and a vertical axis.

In testimony whereof, I have hereunto subscribed my name.

FRANCIS LEE STUART.

Witnesses:
E. R. SPARKS,
A. H. SCHAEFFER.

Copies of this patent may be obtained for five cents each, by addressing the "Commissioner of Patents, Washington, D. C."